US012527650B2

United States Patent
Marks et al.

(10) Patent No.: US 12,527,650 B2
(45) Date of Patent: Jan. 20, 2026

(54) SYSTEMS AND METHODS FOR PROVIDING ORAL DEVICES USING AT-HOME DENTAL IMPRESSION KITS

(71) Applicant: Reset Technology Corporation, Wilmington, DE (US)

(72) Inventors: Justin Spencer Marks, Glen Head, NY (US); Clayton Adams Teufel, Chicago, IL (US); Mark Teufel, Highland Beach, FL (US)

(73) Assignee: Reset Technology Corporation, Wilmington, DE (US)

( * ) Notice: Subject to any disclaimer, the term of this patent is extended or adjusted under 35 U.S.C. 154(b) by 18 days.

(21) Appl. No.: 17/847,153

(22) Filed: Jun. 22, 2022

(65) Prior Publication Data

US 2022/0401192 A1    Dec. 22, 2022

Related U.S. Application Data

(60) Provisional application No. 63/213,509, filed on Jun. 22, 2021.

(51) Int. Cl.
*A61C 9/00*    (2006.01)

(52) U.S. Cl.
CPC .......... *A61C 9/0006* (2013.01); *A61C 9/0053* (2013.01)

(58) Field of Classification Search
CPC ....... A61C 7/002; A61C 9/0006; A61C 9/004; A61C 9/0053; A61C 13/00–0024;
(Continued)

(56) References Cited

U.S. PATENT DOCUMENTS

| 4,763,791 A * | 8/1988 | Halverson | A61C 9/00 |
| | | | 433/37 |
| 2006/0063135 A1 * | 3/2006 | Mehl | G06F 18/28 |
| | | | 433/213 |

(Continued)

OTHER PUBLICATIONS

"Affordable Teeth Devices, 25% Office | Do It Yourself Dental Impression Kit", retrieved from the Internet at: <https://web.archive.org/web/20210614024810/https://doityourselfdentalimpressionkit.com/ (Jun. 14, 2021).

(Continued)

*Primary Examiner* — Thomas C Barrett
*Assistant Examiner* — Shannel Nicole Belk
(74) *Attorney, Agent, or Firm* — MARSHALL, GERSTEIN & BORUN LLP; Randall G. Rueth

(57) ABSTRACT

Systems and methods for providing oral devices using at-home dental impression kits are disclosed herein. An example method includes scheduling an at-home dental impression kit to be sent to a user that includes at least (i) one or more dental trays and (ii) one or more sets of dental putty that are configured to capture the gingiva of the user without distorting the gum lines of the user. The example method further includes scanning a first impression that is representative of the user's upper jaw, and a second impression that is representative of the user's lower jaw. The example method further includes generating a digital rendering of an oral device, and uploading the digital rendering to an application for viewing by the user. The example method further includes fabricating the oral device based upon digital rendering, and scheduling the oral device to be sent to the user.

20 Claims, 7 Drawing Sheets

(58) Field of Classification Search
CPC ......... A61C 13/34; A61C 19/05; A61C 19/10; G16H 10/20; G16H 10/60; G16H 80/00; G16H 30/00; G16H 30/20; G16H 30/40; G16H 40/40
USPC .......................................... 433/37, 213, 214
See application file for complete search history.

(56) References Cited

U.S. PATENT DOCUMENTS

| | | | | |
|---|---|---|---|---|
| 2007/0154866 | A1* | 7/2007 | Hall | A61C 1/084 433/213 |
| 2009/0133260 | A1* | 5/2009 | Durbin | A61C 13/082 29/896.11 |
| 2010/0076581 | A1* | 3/2010 | Violante | A61C 9/0046 433/199.1 |
| 2011/0125304 | A1* | 5/2011 | Schneider | G16H 30/40 700/106 |
| 2011/0183293 | A1* | 7/2011 | Tchouangang | A61C 19/066 433/213 |
| 2012/0205828 | A1* | 8/2012 | Laubersheimer | A61C 13/0004 264/20 |
| 2015/0182314 | A1* | 7/2015 | Morales | A61C 13/0004 700/98 |
| 2016/0135925 | A1* | 5/2016 | Mason | A61C 7/002 703/2 |
| 2017/0312060 | A1* | 11/2017 | Morales | A61C 13/0004 |
| 2018/0285801 | A1* | 10/2018 | Alde | G06Q 10/10 |
| 2018/0368954 | A1* | 12/2018 | Katzman | A61C 7/002 |
| 2019/0152152 | A1* | 5/2019 | O'Leary | B33Y 30/00 |
| 2019/0378344 | A1* | 12/2019 | Long | A61C 13/0004 |
| 2020/0088582 | A1* | 3/2020 | Schlegel | G06T 7/74 |
| 2020/0281697 | A1* | 9/2020 | Brandt | G16H 30/20 |
| 2022/0097307 | A1* | 3/2022 | Erickson | B33Y 50/00 |
| 2023/0048898 | A1* | 2/2023 | Cofar | A61C 13/0004 |
| 2023/0346513 | A1* | 11/2023 | Gao | G06T 7/0012 |

OTHER PUBLICATIONS

"At Home Impression Kits—OXSmiles", retrieved from the Internet: https://web.archive.org/web/20210509005125/https://www.oxsmiles.com/at-home-impression-kits/> (May 9, 2021).

Lin et al., Accuracy of impression materials for complete-arch fixed partial dentures, Journal of Prosthetic Dentistry, 59(3):288-91 (Mar. 1988).

International Application No. PCT/US2022/034502, International Search Report and Written Opinion, mailed Oct. 6, 2022.

\* cited by examiner

SYSTEMS AND METHODS FOR PROVIDING ORAL DEVICES USING AT-HOME DENTAL IMPRESSION KITS

CROSS-REFERENCE TO RELATED APPLICATIONS

This application claims the benefit of U.S. Provisional Application No. 63/213,509, filed Jun. 22, 2021, and entitled "SYSTEMS AND METHODS FOR PROVIDING ORAL DEVICES USING AT-HOME DENTAL IMPRESSION KITS", which is incorporated herein by reference in its entirety.

BACKGROUND

It is estimated that over 178 million Americans, approximately 50% of the adult population, are missing one or more teeth and require tooth replacement. These individuals may require full dentures to replace all teeth via a single removable prosthetic, partial dentures to replace one or several teeth via one or more removable or non-removable prosthetics, or dental implant(s) via an invasive surgical procedure that replaces one or more teeth via a non-removable prosthetic anchored into the individual's jawbone. However, only one million or so Americans receive tooth replacements each year. The remainder generally lack access to dental services due primarily to prohibitively high costs (up to $6,000 per tooth for dental implants), fear of invasive surgical procedures, fear of going to a dentist, and/or lack of dental care within a reasonable commuting distance.

While partial dentures offer a promising form of tooth replacement, conventional partial dentures generally require 4 to 5 dentist visits, significant adjustments, and a substantial amount of time at the dentist office to fit the prosthetic properly and comfortably. Typically, conventional partials require, at a minimum, a first dental office visit to take a dental impression or digital scan that gathers the oral aspects of the recipient's mouth, and a second dental office visit to fit the partial into the recipient's mouth to avoid damaging the surrounding teeth with an ill-fitted partial. Unfortunately, 2 to 3 additional dental office visits are normally required for adjustments, which can significantly increase the time and costs associated with a partial denture.

Moreover, conventional at-home dental impression kits fail to adequately capture the necessary impressions of a patient's mouth in order to fabricate a suitable partial denture. For example, conventional at-home dental impression kits normally fail to account for a patient's gingiva and a patient's total bite registration when fabricating oral devices. As a result, oral devices fabricated using conventional oral device fabrication techniques with at-home dental impression kits either cause the patient discomfort because the oral device painfully contacts the patient's gum line, and/or the oral device negatively impacts the patient's bite due to uneven contact with the opposing jaw. Consequently, conventional techniques generally fail to provide patients with oral devices that are quickly delivered, accurately fabricated, and affordable.

Thus, a need exists for systems and methods for providing oral devices using at-home dental impression kits that allow a patient to receive a well-fitted, affordable oral device in a timely fashion without excessive (or any) trips to a dental office.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Generally, as previously mentioned, technology is allowing direct-to-consumer delivery of dental-related products and services to further reduce/eliminate in-office contact and cost. Specifically, the systems and methods for providing oral devices using at-home dental impression kits described herein allow consumers to independently submit dental impressions, which may be used to automatically fabricate oral devices that require little or no adjustment and can be inserted by the recipient to eliminate the need for a dental office visit.

Through the systems and methods described herein, a patient may capture dental data (e.g., dental impressions) remotely, and may receive dentist approval and supervisory services remotely via the Internet or telephonically. Further, the systems and methods of the present disclosure may remotely manufacture (via 3D printing and finishing) a flexible and removable oral device (also referenced herein as a "prosthetic" a "partial denture" or a "denture") that requires little or no user adjustment to replace one or several missing teeth, and may deliver the oral device directly to a patient. As a result of these systems and methods, the patient may insert the oral device themselves, thus eliminating the need to visit a dental office and significantly reducing the time and cost of tooth replacement.

As such, the systems and methods disclosed herein provide a unique solution to the problems previously described (and others) with respect to conventional techniques, and allow patients to replace one or more missing teeth without the patient ever visiting a dental office.

In one aspect, the present invention is a system for providing oral devices using at-home dental impression kits. The system comprises: one or more processors; and one or more non-transitory memories, wherein the one or more non-transitory memories store computer-readable instructions that specially configure the system such that, when executed by the one or more processors, the one or more non-transitory memories cause the system to: schedule an at-home dental impression kit to be sent to a user, wherein the at-home dental impression kit includes at least (i) one or more dental trays and (ii) one or more sets of dental putty that are configured to capture the gingiva of the user without distorting the gum lines of the user, receive, from a scanner, a first impression that is representative of an upper jaw of the user that is captured using a first dental tray and a first set of dental putty, and a second impression that is representative of a lower jaw of the user that is captured using a second dental tray and a second set of dental putty, generate a digital rendering of an oral device based upon the first impression and the second impression, upload the digital rendering to an application for viewing by the user, fabricate an oral device based upon the digital rendering, and schedule the oral device to be sent to the user.

In a variation of this aspect, the first impression includes impressions representative of the teeth of the upper jaw of the user, the oral arches of the upper jaw of the user, and the gingiva of the upper jaw of the user, and wherein and the second impression includes impressions representative of the teeth of the lower jaw of the user, the oral arches of the lower jaw of the user, and the gingiva of the lower jaw of the user.

In another variation of this aspect, the oral device is a partial denture configured to replace one or more missing teeth of the user.

In yet another variation of this aspect, the at-home dental impression kit further includes a bite registration tray, and the computer-readable instructions further configure the system such that, when executed by the one or more processors, the one or more non-transitory memories cause the system to: receive, from the scanner, a third impression that is representative of the upper jaw of the user and the lower jaw of the user that is captured using the bite registration tray and a third set of dental putty, generate the digital rendering further based on the third impression, and fabricate the oral device based on the digital rendering.

In still another variation of this aspect, the at-home dental impression kit further includes a tooth shade guide, and the computer-readable instructions further configure the system such that, when executed by the one or more processors, the one or more non-transitory memories cause the system to: receive, from the user, an image of the teeth of the user and the tooth shade guide, compare the teeth of the user featured in the image to the tooth shade guide, determine a tooth shade of the teeth of the user based on the comparison, and fabricate the oral device such that any teeth included as part of the oral device are the tooth shade.

In yet another variation of this aspect, the computer-readable instructions further configure the system such that, when executed by the one or more processors, the one or more non-transitory memories cause the system to: display, via the application, the digital rendering to the user, including a plurality of dimensions of the digital rendering and a projected fit of the oral device, receive, from the user via the application, either an approval or a denial corresponding to the digital rendering, and responsive to receiving the approval from the user, fabricate the oral device.

In still another variation of this aspect, the computer-readable instructions further configure the system such that, when executed by the one or more processors, the one or more non-transitory memories cause the system to: receive, from a user, responses to a pre-screening survey, determine whether or not the user is a candidate for treatment, and responsive to determining that the user is a candidate for treatment, scheduling the at-home dental impression kit to be sent to the user.

In yet another variation of this aspect, the computer-readable instructions further configure the system such that, when executed by the one or more processors, the one or more non-transitory memories cause the system to: responsive to determining that the patient is a candidate for treatment, scheduling the user for a real-time consultation with a dentist.

In still another variation of this aspect, the at-home dental impression kit further includes a website link or a code configured to be scanned by a mobile device that provides video instructions to assist the user in taking the first impression and the second impression.

In another aspect, the present invention is a method for providing oral devices using at-home dental impression kits. The method comprises: scheduling, by one or more processors, an at-home dental impression kit to be sent to a user, wherein the at-home dental impression kit includes at least (i) one or more dental trays and (ii) one or more sets of dental putty that are configured to capture the gingiva of the user without distorting the gum lines of the user; scanning, using a scanner, a first impression that is representative of an upper jaw of the user that is captured using a first dental tray and a first set of dental putty, and a second impression that is representative of a lower jaw of the user that is captured using a second dental tray and a second set of dental putty; generating, by the one or more processors, a digital rendering of an oral device based upon the first impression and the second impression; uploading, by the one or more processors, the digital rendering to an application for viewing by the user; fabricating an oral device based upon the digital rendering; and scheduling, by the one or more processors, the oral device to be sent to the user.

In a variation of this aspect, the first impression includes impressions representative of the teeth of the upper jaw of the user, the oral arches of the upper jaw of the user, and the gingiva of the upper jaw of the user, and wherein and the second impression includes impressions representative of the teeth of the lower jaw of the user, the oral arches of the lower jaw of the user, and the gingiva of the lower jaw of the user.

In another variation of this aspect, the oral device is a partial denture configured to replace one or more missing teeth of the user.

In yet another variation of this aspect, the at-home dental impression kit further includes a bite registration tray, and the method further comprises: scanning, by the scanner, a third impression that is representative of the upper jaw of the user and the lower jaw of the user that is captured using the bite registration tray and a third set of dental putty; generating the digital rendering further based on the third impression; and fabricating the oral device based on the digital rendering.

In still another variation of this aspect, the at-home dental impression kit further includes a tooth shade guide, and the method further comprises: receiving, from the user, an image of the teeth of the user and the tooth shade guide; comparing, by the one or more processors, the teeth of the user featured in the image to the tooth shade guide; determining, by the one or more processors, a tooth shade of the teeth of the user based on the comparison; and fabricating the oral device such that any teeth included as part of the oral device are the tooth shade.

In yet another variation of this aspect, the method further comprises: displaying, via the application, the digital rendering to the user, including a plurality of dimensions of the digital rendering and a projected fit of the oral device; receiving, from the user via the application, either an approval or a denial corresponding to the digital rendering; and responsive to receiving the approval from the user, fabricating the oral device. Further in this variation, the method further comprises: automatically transmitting, by the one or more processors, the digital rendering to a dentist; scheduling, by the one or more processors, a rendering review session with the user and dentist to allow the user and the dentist to substantially simultaneously review the digital rendering and the projected fit in real-time; and receiving, from the user via the application, either the approval or the denial during the rendering review session.

In still another variation of this aspect, the method further comprises: receiving, from a user, responses to a pre-screening survey; determining, by the one or more processors, whether or not the user is a candidate for treatment; and responsive to determining that the user is a candidate for treatment, scheduling, by the one or more processors, the at-home dental impression kit to be sent to the user. Further in this aspect, the method further comprises: responsive to determining that the patient is a candidate for treatment, scheduling, by the one or more processors, the user for a real-time consultation with a dentist.

In yet another variation of this aspect, the at-home dental impression kit further includes a website link or a code configured to be scanned by a mobile device that provides video instructions to assist the user in taking the first impression and the second impression.

In yet another aspect, the present invention is a non-transitory computer-readable storage medium having stored thereon a set of instructions, executable by at least one processor, for providing oral devices using at-home dental impression kits. The instructions comprise: instructions for scheduling an at-home dental impression kit to be sent to a user, wherein the at-home dental impression kit includes at least (i) one or more dental trays and (ii) one or more sets of dental putty that are configured to capture the gingiva of the user without distorting the gum lines of the user; instructions for receiving, from a scanner, a first impression that is representative of an upper jaw of the user that is captured using a first dental tray and a first set of dental putty, and a second impression that is representative of a lower jaw of the user that is captured using a second dental tray and a second set of dental putty; instructions for generating a digital rendering of an oral device based upon the first impression and the second impression; instructions for uploading the digital rendering to an application for viewing by the user; instructions for fabricating an oral device based upon the digital rendering; and instructions for scheduling the oral device to be sent to the user.

Advantageously, the techniques of the present disclosure relate to improvements to other technologies or technical fields at least because the present disclosure describes or introduces improvements to oral device fabrication systems and the field of oral device fabrication generally, where dental impressions representative of user's mouths are scanned autonomously by an oral device fabrication system that then proceeds to digitally render an oral device based on the scanned impressions and fabricate the oral device represented by the digital renderings. This improves over the prior art at least because existing systems lack such autonomous functionality and are simply not capable of converting user-specific impressions into digital renderings for oral devices that thereby enable the system to output a fully fabricated oral device that accurately replicates the device represented in the digital renderings.

As such, the techniques of the present disclosure further improve over conventional techniques in the field of oral device fabrication by eliminating excessive, time-consuming trips to a dental office to re-fit a dental device fabricated by conventional means. By contrast, the present techniques are highly accurate when fabricating the oral device because the fabrication is based upon a digital rendering of an oral device that is based upon impressions (and corresponding digital renderings) of a user's mouth interior that includes the position of all the user's teeth, the user's oral arches, and the user's gingiva, which was not possible with conventional techniques.

In addition, the present disclosure relates to improvement to other technologies or technical fields at least because the present disclosure describes or introduces improvements to computing devices in the oral device fabrication field, whereby the oral device processing application executing on the central server and/or computing devices (e.g., 3D printer, scanner, finishing module) improve the underlying computer devices, as such computer devices are made more efficient by the configuration, adjustment, or adaptation of the disclosed network architecture. For example, in some aspects, fewer machine resources (e.g., processing cycles or memory storage) may be used by decreasing the computational resources required as a result of the network architecture utilized to fabricate oral devices compared to conventional systems. Such reduction frees up the computational resources of an underlying computing system, thereby making it more efficient.

The present disclosure also includes applying certain of the claim elements with, or by use of, a particular machine, which receives impressions representative of a mouth of a user, generates digital renderings of an oral device based on the impressions, automatically prints an oral device based on the digital renderings, and schedules the printed oral device for shipment to the user. In addition, the present disclosure includes specific features other than what is well-understood, routine, conventional activity in the field, or adding unconventional steps that confine the claim to a particular useful application, e.g., scheduling an at-home dental impression kit to be sent to a user, wherein the at-home dental impression kit includes at least (i) one or more dental trays and (ii) one or more sets of dental putty that are configured to capture the gingiva of the user without distorting the gum lines of the user.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

FIG. 10 is an example bite registration tray used to take a bite registration as part of providing oral devices using at-home dental impression kits, in accordance with embodiments described herein.

DETAILED DESCRIPTION

Figure 1A:
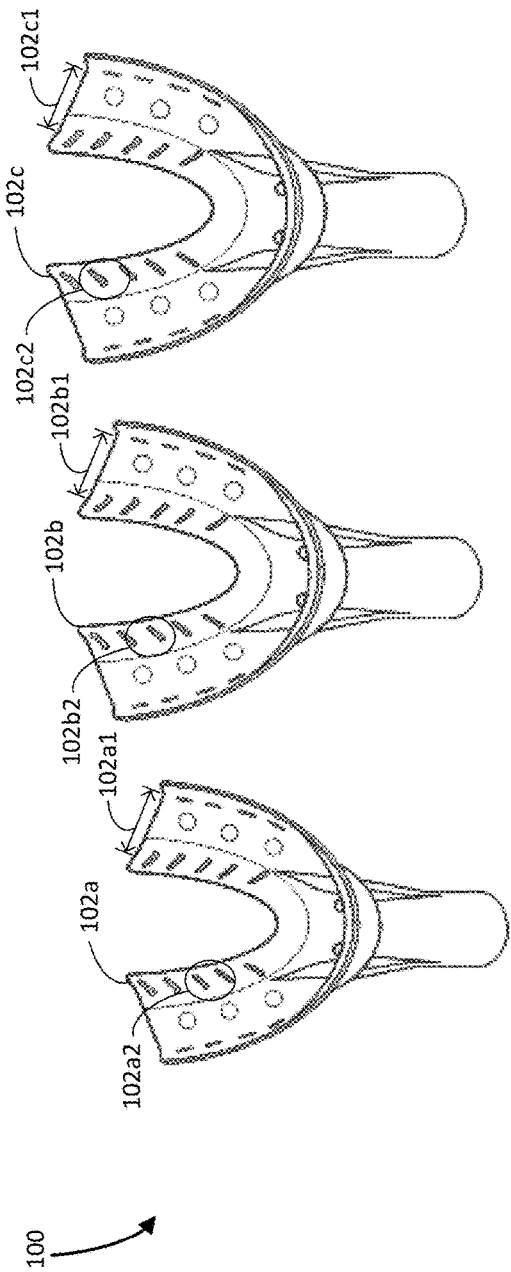
FIG. 1A is an example set of dental impression trays used to take dental impressions as part of providing oral devices using at-home dental impression kits, in accordance with embodiments described herein.

The present embodiments relate to, inter alia, systems and methods for providing oral devices using at-home dental impression kits. For instance, a user (also referenced herein as a "patient") may request and/or otherwise be recommended for an at-home dental impression kit in order to obtain a replacement for one or more missing teeth. The user may thereafter take dental impressions of the user's teeth using the materials provided as part of the at-home dental impression kit and ship the various impressions and/or images to a fabrication facility for processing. As described herein, the dental impressions may utilize a particular dental impression putty (also referenced herein as "dental putty" or "impression putty") and dental impression tray(s) (also referenced herein as "dental trays" or "impression trays") that are configured to capture at least teeth impressions and gingiva impressions of the user. These impressions may then be scanned at the fabrication facility, digitally rendered, and used to generate digital renderings of an oral device that may be uploaded for user/dentist approval. When approved, the oral device may be automatically fabricated (e.g., 3D printed, finished, etc.) in accordance with the digital rendering. As referenced herein, the "oral device" may generally be and/or include dentures, implants, aligners, crowns, veneers, partials, relines, mouth guards, retainers, and so forth.

Generally, an at-home dental impression kit may include all components necessary to take well-defined dental impressions, and may be stored prior to shipment to a user. As such, the kit and all materials contained therein (e.g., dental impression trays, dental impression putty) may be stored in a temperature controlled environment (e.g., approximately 76°, for instance). Additionally, the contents of the kit may be handled in a clean environment in order to increase the quality of the materials sent to the user, and as a result, the impressions of the user's teeth obtained using the materials in the kit. To ensure reliable shipment of the at-home dental impression kits, each kit may include a tracking number to enable a user to track the kit during shipment.

The materials included in the at-home dental impression kits described herein may include dental impression trays, dental impression putty containers (both base and catalyst putties), bite registration tray(s), cheek retractor(s), a shade guide, a set of vinyl gloves, an instruction pamphlet, return shipping materials (e.g., name card, return label/sticker, etc.), and/or any other suitable materials or combinations thereof. The instruction pamphlet may include instructions for taking dental impressions using the materials included as part of the at-home dental impression kit. For example, the instruction pamphlet may generally instruct a user to mix a container of base putty with a container of catalyst putty to form a moldable putty mixture. The instruction pamphlet may go on to instruct the user to position the moldable putty mixture in one of the dental impression trays to form a dental impression of the user's upper teeth. Similarly, the instruction pamphlet may instruct the user to mix a second container of base putty with a second container of catalyst putty to form another moldable putty mixture that is positioned in a second dental impression tray to form a dental impression of the user's lower teeth.

To illustrate, FIG. 1A is an example set of dental impression trays 100 used to take dental impressions as part of providing oral devices using at-home dental impression kits, in accordance with embodiments described herein. The set of dental impression trays 100 may include dental impression trays of multiple different sizes. For example, the first dental impression tray 102$a$ may be a relatively small sized tray, the second dental impression tray 102$b$ may be a relatively medium sized tray, and the third dental impression tray 102$c$ may be a relatively large sized tray. Moreover, an at-home dental impression kit may include one or more of each of the first, second, and/or third dental impression trays 102$a$, 102$b$, 102$c$.

Generally, a user receiving an at-home dental impression kit that includes the set of dental impression trays 100 may initially place each of the different sized dental trays 102$a$, 102$b$, 102$c$ into their mouth to determine the proper size (e.g., based on which sized tray best fits the user's teeth). The user may then administer the dental impression using the appropriately sized dental impression trays 102$a$, 102$b$, 102$c$. The at-home dental impression kit may also include various sizes of dental trays that are specifically designed to capture a user's upper dental arch and/or a user's lower dental arch.

The set of dental impression trays 100 may each be a substantially arched tray that is sized and shaped to be inserted into the user's mouth. Particularly, each of the dental impression trays 102$a$, 102$b$, 102$c$ may be sized and shaped to be received into either an upper portion or a lower portion of the user's mouth (e.g., a user's upper or lower jaw). Each of the dental impression trays 102$a$, 102$b$, 102$c$ may include a cavity as defined by a bottom wall and a pair of sidewalls that extend upward from the bottom wall. The bottom wall may generally provide a divider between the user's teeth that are inserted into the tray and the other set of the user's teeth (e.g., upper row or lower row) that are not inserted into the tray. The side walls may generally contain the dental putty such that a user may effectively take a dental impression.

As illustrated in FIG. 1A, the cavity of each of the dental impression trays 102$a$, 102$b$, 102$c$ may be sized to receive the dental putty such that a user may administer a dental impression. Specifically, each of the cavities may be particularly sized such that a user may capture an impression of the user's teeth and gingiva when the dental putty is inserted into the cavity of the dental impression tray (e.g., the first dental impression tray 102$a$). For example, the first dental impression tray 102$a$ may include a first cavity width 102$a$1 and a first cavity depth 102$a$2 (indicated as the height of one side wall) that are sufficient to contain and apply the dental putty to both the user's teeth and gingiva. As a result, when the user bites down on the first dental impression tray 102$a$ with a dental putty mixture contained within the cavity, the user may generate a dental impression that captures both the user's teeth (upper row, lower row, or both) and the user's surrounding gingiva. Similarly, each of the set of dental impression trays 100 may be sized such that the user may capture impressions of the user's teeth and gingiva. For example, the second dental impression tray 102$b$ may include a second cavity width 102$b$1 and a second cavity depth 102$b$2 (indicated as the height of one side wall) and the third dental impression tray 102$c$ may include a third cavity width 102$c$1 and a third cavity depth 102$c$2 (indicated as the height of one side wall) that are sufficient to contain and apply the dental putty to both the user's teeth and gingiva.

Figure 1B:
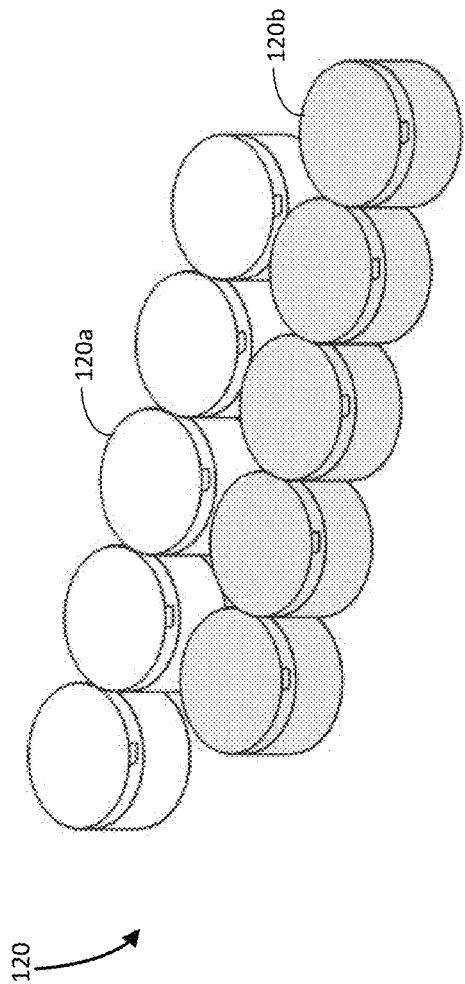
FIG. 1B is an example set of dental impression putty material used to take dental impressions as part of providing oral devices using at-home dental impression kits, in accordance with embodiments described herein.

Of course, in order for the user to take impressions with an at-home dental impression kit, the user will require dental impression putty. Accordingly, FIG. 1B is an example set of dental impression putty material 120 used to take dental impressions as part of providing oral devices using at-home dental impression kits, in accordance with embodiments described herein. Generally, the set of dental impression putty material 120 may be categorized as two primary putty types: a base putty 120a and a catalyst putty 120b. The base putty 120a may combine with the catalyst putty 120b to form a moldable putty mixture that may rapidly harden/ solidify in order to quickly and accurately obtain dental impressions.

For example, the catalyst putty 102b may provide a predetermined setting time when mixed with the base putty 120a. The predetermined setting time may be based on a period of time necessary for a user to fully combine the two putties 120a, 120b into a homogenous mixture, place the putty mixture into a cavity of a dental impression tray (e.g., first dental impression tray 102a), and insert the filled dental impression tray into the user's mouth to form a dental impression. That is, the predetermined setting time may be selected to provide the user enough time to correctly prepare the materials (e.g., putty and tray) to take a dental impression, while also preventing the putty mixture from deforming when the filled dental tray is removed from the user's mouth.

Moreover, unlike conventional dental putties (e.g., used in orthodontics), the set of dental impression putty material 120 included in the at-home dental impression kits of the present disclosure are sufficiently soft to form impressions of a user's teeth and gingiva when a user bites down on a dental impression tray (e.g., first dental impression tray 102a). More specifically, the dental impression putty material 120 included in the at-home dental impression kits of the present disclosure are sufficiently soft to form clear impressions of the user' teeth and gingiva without applying pressure (e.g., muco-compression) that would distort the resulting teeth/gingiva impression. As illustrated in FIG. 1B, the user may be provided with multiple individual containers of both the base putty 120a and the catalyst putty 120b. Each individual container of the base putty 120a and the catalyst putty 120b may be portioned such that a user may capture an acceptable dental impression of their teeth and gingiva while generally lessening the likelihood of the putty mixture overflowing the cavity of the dental impression tray. For example, the user may be provided an amount of base putty 120a and catalyst putty 120b that, when the putty mixture is prepared and placed in a dental impression tray (e.g., first dental impression tray 102a), enough putty mixture is in the dental impression tray to sufficiently capture a dental impression of the user's teeth and gingiva.

To provide a more well-rounded assessment of a user's tooth replacement needs, the user's bite may also be considered. For example, as a user loses more teeth, fabricating partial dentures to replace those missing teeth may become more difficult without understanding how the user's lower jaw and upper jaw come together. Accordingly, FIG. 10 is an example bite registration tray 140 used to take a bite registration as part of providing oral devices using at-home dental impression kits, in accordance with embodiments described herein.

The bite registration tray 140 may include a middle portion 142 that provides a barrier between the user's upper jaw and lower jaw when the user bites down on the bite registration tray 140 to capture a bite registration. The middle portion 142 is disposed within side walls that extend in both upward and downward directions, thereby defining both an upper cavity and a lower cavity. Both cavities may effectively receive and contain the base putty 120a and the catalyst putty 120b putty mixture when a user inserts the bite registration tray 140 into their mouth and when the user bites down on the bite registration tray 140 to capture their bite registration. As a result, the bite registration tray 140 may allow a user to obtain a bite registration that captures the relative placement of a user's upper row of teeth compared to the user's lower row of teeth when the user bites down normally.

Figure 1D:
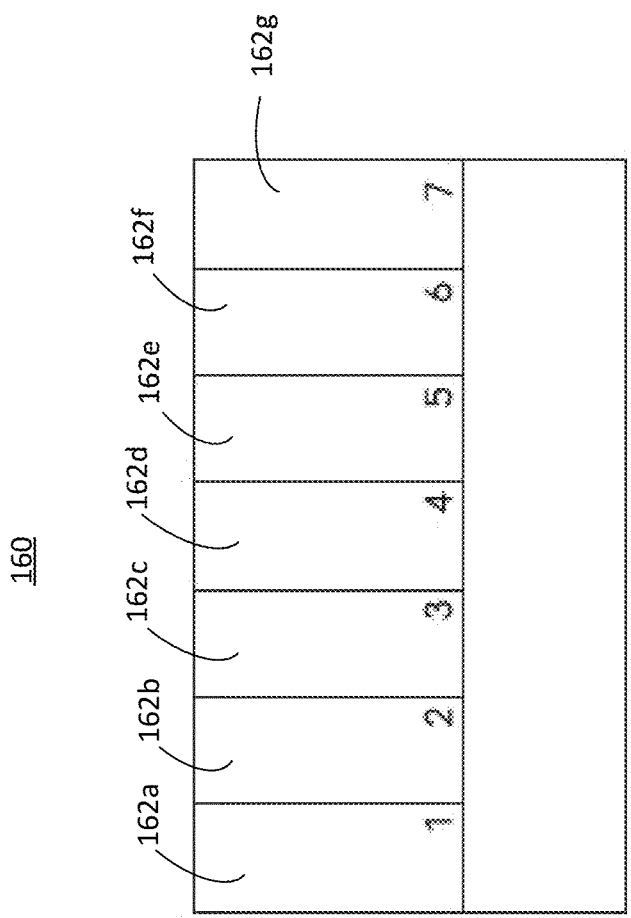
FIG. 1D is an example shade guide used to match a user's custom tooth shade as part of providing oral devices using at-home dental impression kits, in accordance with embodiments described herein.
Figure 1C:
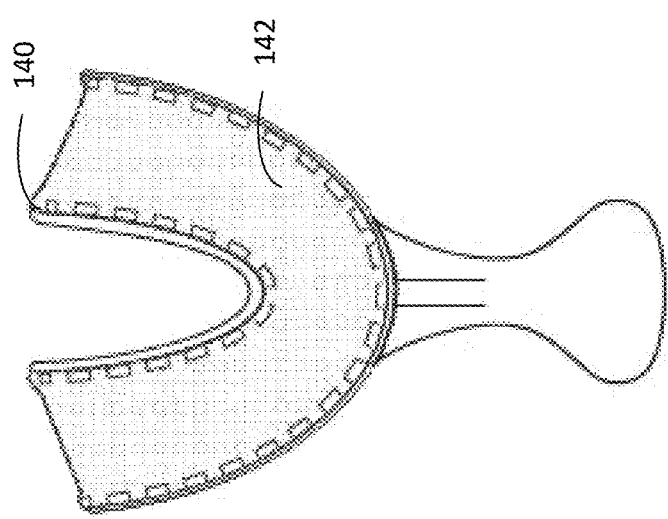

Another important aspect of replacing missing teeth is matching the color of the user's remaining teeth to produce a uniform visual appearance. To achieve this color matching, FIG. 1D is an example shade guide 160 used to match a user's custom tooth shade as part of providing oral devices using at-home dental impression kits, in accordance with embodiments described herein. The example shade guide 160 may include multiple color shade portions 162a-162g that each represent normal shades associated with teeth (e.g., shades of white). As such, the color shade portions 162a-162g may range from a perfect white/marginally off-white to a darker, tawny and/or yellowish color shade portion. For example, a first color shade portion 162a (illustrated in FIG. 1D with a "1") may be colored as the perfect white/marginally off-white portion of the example shade guide 160, and the seventh color shade portion 162g (illustrated in FIG. 1D with a "7") may be colored as the darker, tawny and/or yellowish color shade portion. Further in this example, each of the second color shade portion 162b (illustrated in FIG. 1D with a "2"), the third color shade portion 162c (illustrated in FIG. 1D with a "3"), the fourth color shade portion 162d (illustrated in FIG. 1D with a "4"), the fifth color shade portion 162e (illustrated in FIG. 1D with a "5"), and the sixth color shade portion 162f (illustrated in FIG. 1D with a "6") may be colored such that each subsequent color portion is darker relative to the preceding color portion. In this manner, the color portions 162b-162f may create a color gradient between the first color portion 162a and the seventh color portion 162g.

Of course, it is to be appreciated that the example shade guide 160 contains seven color portions 162a-162g only for the purpose of discussion. The example shade guide 160 may include any suitable number of color shade portions, the color shade portions may be arranged in any suitable manner, and the color shade portions may include any suitable colors.

Figure 2A:
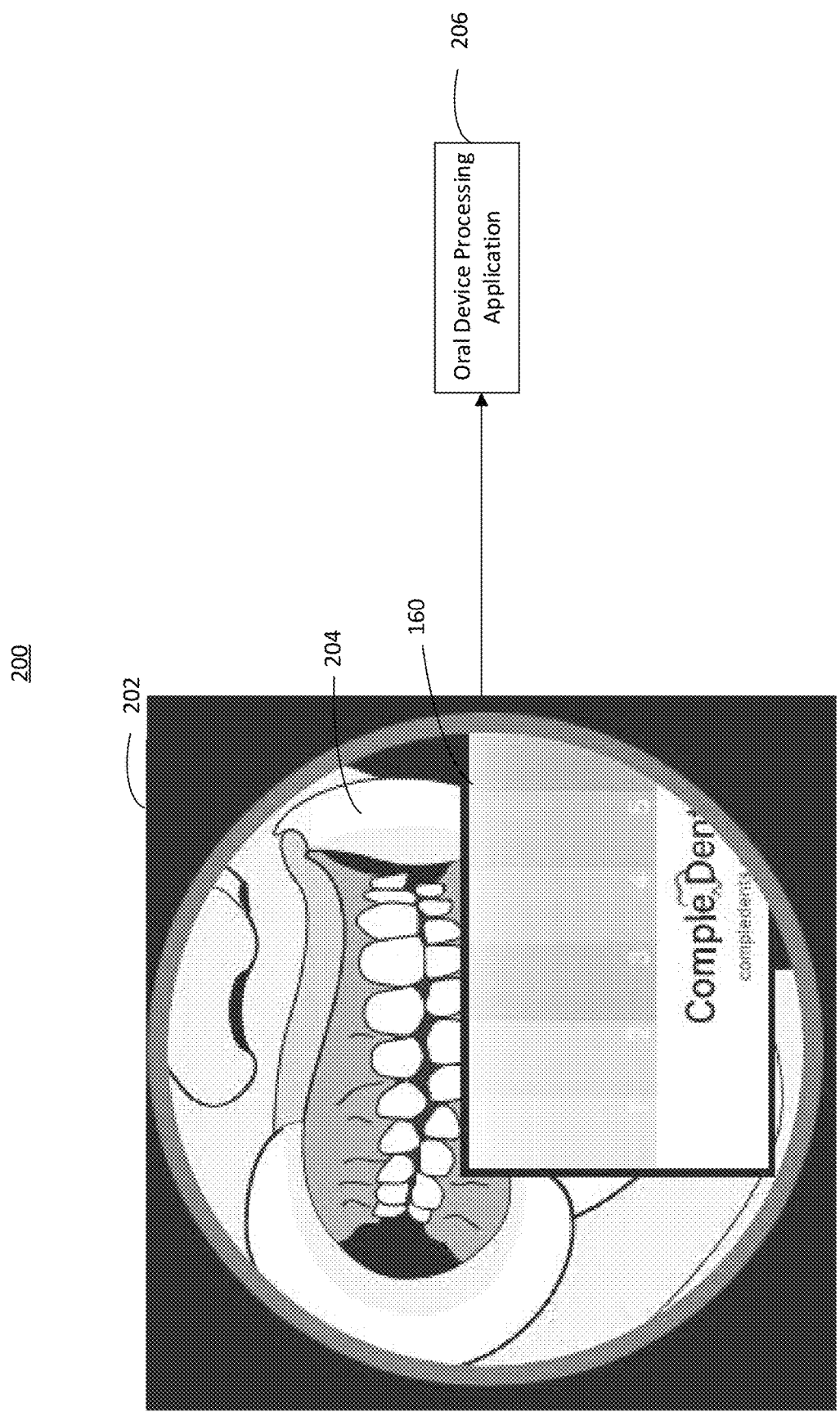
FIG. 2A depicts an example color shade matching used to provide color-matched oral devices using at-home dental impression kits, in accordance with embodiments described herein.

Using the techniques of the present disclosure, a user may upload images of their teeth proximate to the example shade guide 160 to receive color-matched oral devices (e.g., partial dentures, etc.). As an example, FIG. 2A depicts an example color shade matching 200 used to provide color-matched oral devices using at-home dental impression kits, in accordance with embodiments described herein. The example color shade matching 200 includes a user-captured image 202 featuring the example shade guide 160 and a user's mouth that is held open by a cheek retractor 204. The cheek retractor 204 may generally include a handle and a pair of flanges at each end that are configured to separate the user's lips to open the user's mouth. Thus, in the position illustrated in FIG. 2A, the user may photograph their teeth in a manner that allows the oral device processing application 206 to provide a color match with the example shade guide 160.

Generally, when the user captures the user-captured image 202, the user may upload the image to the oral device processing application 206, which is configured to receive the user-captured image 202. For example, the oral device processing application 206 may be a web application that is hosted on a central server that is also connected to an oral device fabrication facility/network. The oral device processing application 206 may perform color matching on the user's teeth included in the user-captured image 202 and the example shade guide 160 to determine a custom tooth shade corresponding to the user's teeth. Thereafter, when the oral device processing application 206 proceeds with fabricating the user's oral device, the application 206 may apply a coating to the oral device and/or otherwise utilize materials that match the custom tooth shade of the user.

Additionally, the oral device processing application 206 may receive images for multiple views of the user's mouth. For example, the user may be required to submit a view of the user's teeth from straight on and/or from a side angle with the mouth closed and/or with the cheek retractor 204 separating the user's lips. Generally, the user may use the check retractor 204 to separate the user's lips and open the user's mouth while taking the images, as previously described. In certain aspects, the oral device processing application 206 may receive additional images of the user's mouth and teeth, such as an upper, closed view; a left side, closed view; a right side, closed view; and/or a straight-on, full-smile view. Moreover, the required images and/or any additional images may be requested by a dental professional, a hygienist, and/or an oral device fabricator during the techniques described herein.

Further, in certain instances, the oral device processing application 206 may be configured to receive the images of the user's mouth, and to perform facial recognition on those images in order to automatically shade match the user's prosthetic teeth to the user's natural teeth. For example, the user may capture an image (e.g., user-captured image 202) that is transmitted to the oral device processing application 206, and the user may desire to shade match any resulting prosthetic teeth with the user's current natural tooth shade. The oral device processing application 206 may receive the image along with an indication to shade match the prosthetic device with the user's natural teeth, and may proceed to perform a facial recognition algorithm (e.g., geometric, photo-metric, etc.) on the image to determine the location of the user's mouth, and more specifically, the user's teeth. The oral device processing application 206 may then utilize, for example, a color matching algorithm in order to determine an exact or nearly-exact color match for the user's natural teeth (e.g., an estimated shade match), as represented in the image.

When the oral device processing application 206 evaluates/determines the estimated shade match of the user's teeth, the application 206 may compare the estimated shade match to a standard database (not shown) of shades in order to determine a shade to be used for the resulting oral device fabrication. At this point, the oral device processing application 206 may transmit the estimated shade match to the user. The application 206 may display the estimated shade match to the user, and may allow the user to modify/adjust the shade to fit the user's preference.

For example, the user may receive the estimated shade match from the oral device processing application 206, and may desire that the shade of the resulting oral device be several shades lighter. Accordingly, the user may manually adjust the shade match (e.g., using an adjustable shade slider bar, entering shade value numbers, etc.) to the user's lighter preference, and may submit the adjusted lighter shade value to the oral device processing application 206. The oral device processing application 206 may then store the adjusted lighter shade value in memory until the application 206 instructs various devices to fabricate the oral device, at which time, the application 206 may cause those various devices to fabricate the oral device to the adjusted lighter shade value instead of the estimated shade match.

Figure 2B:
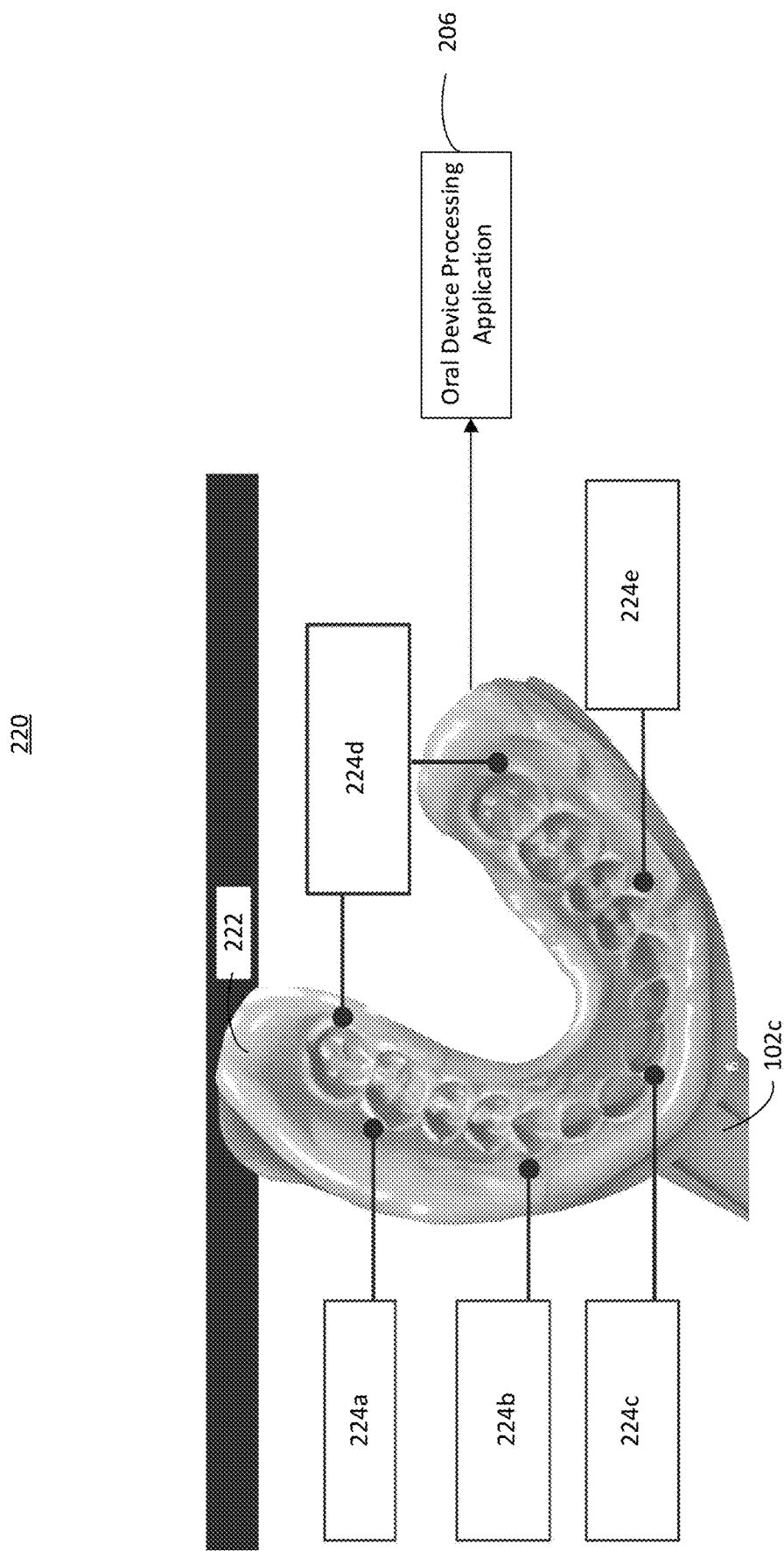
FIG. 2B depicts an example dental impression evaluation using a dental impression tray from FIG. 1A and dental impression putty from FIG. 1B that is used to provide oral devices using at-home dental impression kits, in accordance with embodiments described herein.

Further, the oral device processing application 206 may be configured to process any received dental impressions. For example, FIG. 2B depicts an example dental impression evaluation 220 using a dental impression tray (e.g., third dental impression tray 102c) from FIG. 1A and dental impression putty (e.g., mixture of base putty 120a and catalyst putty 120b) from FIG. 1B that is used to provide oral devices using at-home dental impression kits, in accordance with embodiments described herein. The dental impression tray 102c may include a putty mixture 222 that a user has applied to the dental impression tray 102c and bitten into to form a dental impression. As a result, the dental impression may include several notable features that indicate whether or not the user has taken a high quality dental impression.

Generally, these notable features may include a clear imprint of each tooth (represented by 224a), a uniform mixture of the dental putty (represented by 224b), no visible plastic or other composite material of the dental impression tray 102c (represented by 224c), the user's back molars are clearly visible (represented by 224d), and a distinct gum line of the user (represented by 224e). In this manner, a high quality dental impression utilized by the techniques of the present disclosure includes a full and accurate representation of each of the user's teeth, and the user's gingiva (e.g., gum line) are visibly present alongside the user's teeth.

In order for a user to administer a dental impression similar to the impression illustrated in FIG. 2B, the instruction pamphlet included as part of the at-home dental impression kit may include several instructions guiding the user accordingly. For example, the instructions may instruct a user to first put on gloves included with the kit. In certain aspects, the gloves included as part of the at-home dental impression kit may be vinyl gloves to avoid excessive sticking to the putty mixture. When the user has put on the gloves, the instructions may direct the user to remove one base putty disc from a base putty container (e.g., the base putty 120a) and one catalyst putty disc from a catalyst putty container (e.g., the catalyst putty 120b). To achieve the uniform mixture represented by 224b, the instructions may have the user knead the putty vigorously to ensure that no streaks or swirls of differently colored putty (e.g., the base putty 120a and the catalyst putty 120b) remain in the putty mixture. For example, the instructions may instruct the user to mix the two putties into a single uniform color for approximately 30 seconds, or any other suitable length of time, as previously described.

Once thoroughly mixed, the instructions may direct the user to roll the putty mixture between the user's hands to create a log-like shape with the putty mixture, and to place the log-like shape into the curved cavity of the impression tray (e.g., dental impression tray 102c). In certain aspects, the instructions may direct the user to roll the putty mixture such that a portion of the putty mixture (approximately 1 inch, for instance) extends beyond the length of the curved cavity of the impression tray. In these aspects, the instructions may further direct the user to remove the portion of the putty mixture extending beyond the curved cavity and to place it in the center of the impression tray. For example, in instances where the dental impression tray includes a central form intended to fit the user's upper dental arch and/or the user's lower dental arch, the instructions may direct the user to place the portion of the putty mixture on the central form in order to obtain an impression of the user's upper/lower dental arch.

Finally, the instructions may direct the user to open and relax the user's mouth, and to place the filled impression tray into the user's mouth. The instructions may direct the user to apply pressure to the impression tray, once inserted, to keep the impression tray in place and to ensure that the impression tray (and by extension the dental putty) extends onto the user's gums (represented as 224e). After the user has applied pressure for a sufficient amount of time, the user may be instructed to pull their lip over the impression tray and leave the impression tray in place for a predetermined amount of time (e.g., approximately 3 minutes). Specifically, the instructions may direct the user to avoid shifting or wiggling the impression tray in order to maintain clear, consistent impressions (represented as 224a), and to avoid biting forcefully into the dental putty in order to leave dental putty between the user's teeth and the impression tray (represented as 224c). Following the predetermined amount of time, the user may be instructed to remove the impression tray, and prepare the dental impressions for shipping to an oral device fabrication facility and/or a dental impression evaluation location.

In any event, when a user completes the dental impressions, the user may ship the dental impressions to a facility where the impressions may be scanned. Particularly, the oral device processing application 206 may instruct a scanner to scan the received dental impression, and thereby generate a digital rendering of the dental impression. As described herein, the digital rendering may be used to generate an original digital rendering(s) of an oral device that may be uploaded to a central webpage/user portal designed to allow the user and/or a licensed dental professional (e.g., dentist, dental technician, etc.) to review the digital renderings, discuss whether the dental impressions should be re-taken, subsequent treatment steps, and/or any other suitable actions. In the event that the user evaluates the digital renderings and decides to proceed with fabricating one or more oral devices based on the digital renderings, the oral device processing application 206 may proceed to instruct various devices to automatically fabricate any oral devices the user selects.

Of course, in certain instances, the user may be missing one or more teeth, such that the putty mixture included in the dental impression tray may indicate each missing tooth through non-existent impressions of those missing teeth. In these instances, the oral device processing application 206, upon receipt of the impression trays, may instruct a scanner to scan the received dental impression, and generate a digital rendering of the dental impression that includes the missing teeth to be included as part of the fabricated oral prosthesis.

Additionally, or alternatively, the oral device processing application 206 may receive a dental impression that includes a user's teeth that are scheduled for extraction. In this circumstance, the oral device processing application 206 may automatically remove the teeth from the digital scan file based on the teeth that are scheduled for extraction. As an example, the user may suffer from extensive cavities and/or otherwise tooth decay/damage, such that a dentist recommends extraction and replacement of the respective decayed/damaged teeth. Further, the damage to the user's teeth may be localized enough that complete removal/extraction of the user's teeth is unnecessary, and that a partial dental prosthesis is required to fill in the gaps between the user's remaining teeth following the extractions. Accordingly, the user may receive an at-home dental impression kit, and may proceed to take impressions of the user's mouth in order to generate an oral prosthetic device in advance of any tooth extractions.

When the user has taken the impressions, the user may ship the impression trays to a facility where the impressions are scanned. The oral device processing application 206 may instruct a scanner to scan the impression trays, and the user and/or a dentist (e.g., from a dental office 305) may additionally submit an indication of the teeth that are scheduled for removal/extraction. For example, the oral device processing application 206 may receive an indication from a dentist that teeth 4, 5, and 6 are to be extracted from the user's mouth, such that an oral dental prosthesis containing replacements for teeth 4, 5, and 6 will be required after the extraction procedure. In response, the oral device processing application 206 may digitally remove teeth 4, 5, and 6 from the digital scan file of the user's mouth, and may proceed to generate a digital rendering of the replacement dental prosthetic. As part of the digital rendering of the replacement dental prosthetic, the oral device processing application 206 may estimate bone/gingiva loss resulting from the extractions, estimate the appearance/geometry of the sockets after the extractions, and/or any other suitable estimated consequences of such an extraction or combinations thereof. Based on these estimated consequences of the extraction(s), the oral device processing application 206 may estimate dimensions of the teeth and surrounding gingiva that are to be replaced following the extraction(s). The oral device processing application 206 may thereafter instruct various devices to fabricate the dental prosthetic according to the digital renderings that include these estimated dimensions of the teeth and gingiva.

Figure 3A:
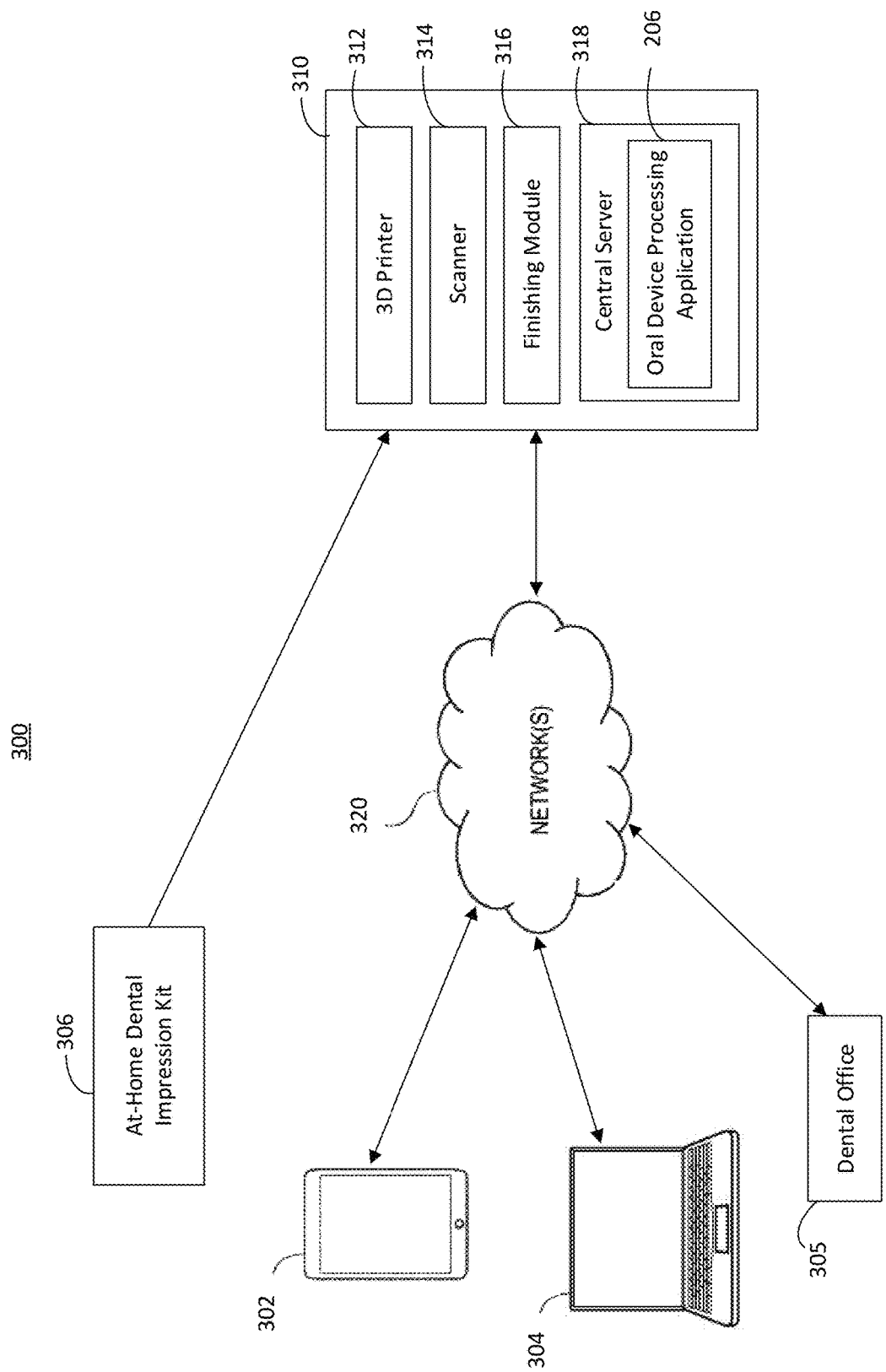
FIG. 3A is an example system for providing oral devices using at-home dental impression kits, in accordance with embodiments described herein.

FIG. 3A is an example system 300 for providing oral devices using at-home dental impression kits, in accordance with embodiments described herein. Generally, the example system 300 may facilitate the end-to-end processing of an oral device from a dental impression of a user's mouth to the fabrication (e.g., printing and finishing) of a corresponding oral device. The example system 300 may include user computing devices 302 and 304, a connected dental office 305, an at-home dental impression kit 306, and an oral device processing system 310 (also referenced herein as an "oral device system"), and a network 320.

The at-home dental impression kit 306 may include materials a user may use to take dental impressions of the user's mouth. The user computing devices 302, 304 may operate/execute an application or platform configured to interface with the oral device processing system 310 (via network 320) when the user has submitted the dental impressions to the system 310. In certain aspects, the oral device processing system 310 may generate one or more digital renderings (e.g., three-dimensional (3D) models) of a patient's mouth interior using the dental impressions. Of course, it may also be possible for the user computing devices 302, 304 to create a digital rendering of the user's mouth interior using captured images of the dental impressions. In any event, the user and/or a dental professional (e.g., a dentist and/or dental technician accessing the application/platform at the dental office 305) may view the digital renderings using the user computing devices 302, 304 and/or the dental office 305 over the network 320.

Generally, the oral device processing system 310 may scan the received dental impressions using the scanner 314, and generate a data file of any suitable format, for example, the industry standard OBJ and STL formats. A native application running, for example, on the central server 318 may connect the data file created by the scanner 314 to an application programming interface (API) that turns the data file into a 3D model as part of a computer-aided design (CAD) file format that is a digital rendering of the 3D model of the patient's mouth interior. The scanner 314 and/or central server 318 may then additionally generate original digital rendering(s) of an oral device based on the 3D model/digital rendering of the user's mouth interior. Additionally, the software executed on the central server 318, the user computing devices 302, 304, and/or the dental office 305 may use real-time web communication technologies (such as those used in video chatting applications) to stream data from the scanner 314 and/or any of the 3D printer 312, finishing module 316, or any of the devices included in the oral device processing system 310 or combinations thereof. In any event, once the digital renderings are created, they can be stored for future retrieval in an S3-compatible object storage system.

The oral device processing system 310 may additionally be configured to receive data from a user computing device (e.g., any of devices/locations 302, 304, 305) that may indicate a user's acceptance of a digital rendering, treatment plan, etc., and to autonomously fabricate an oral device to fit within the patient's mouth. The oral device processing system 310 includes a 3D printer 312, a scanner 314, a finishing module 316, and a central server 318. The central server 318 may include the oral device processing application 206 that is generally configured to manage the processing of the oral device throughout the various stages of fabrication, e.g., scanning, printing, and finishing. The oral device processing application 206 may communicate with each of the 3D printer 312, the scanner 314, and the finishing module 316 in order to transmit processing instructions related to the oral device.

Generally, each of the components of the oral device processing system 310 may include various sub-components configured to enable the components to perform the various functions described herein. For example, in reference to FIG. 3B, each of the 3D printer 312, the scanner 314, and the finishing module 316 may include a controller (312a, 314a, 316a) and a networking interface (312b, 314b, 316b). Of course, it is to be appreciated that the controllers (312a, 314a, 316a) of each of the 3D printer 312, the scanner 314, and the finishing module 316 may be a microcontroller that includes one or more processors (e.g., central processing unit (CPU)), an input/output interface, and/or one or more memories. Moreover, in certain aspects, each of the 3D printer 312, the scanner 314, and/or the finishing module 316 may store all or a portion of the oral device processing application 206 locally, such that each device (312, 314, 316) may independently perform tasks as part of the oral device fabrication without communication with a central server (e.g., central server 318). It should also be appreciated that any mention of a processor, a memory, and/or a controller may reference one or more processors, one or more memories, and one or more controllers.

In any event, the 3D printer 312 may include a controller 312a, a networking interface 312b, and printing hardware 312c. Broadly, the 3D printer 312 may receive executable code from the central server 318 and/or a user device (e.g., user computing device 302, 304, and/or dental office 305) via a wireless connection (e.g., via network 320) and/or a hardwired connection through the networking interface 312b. The executable code may generally include specifications related to the physical fabrication of the oral device, such as printing materials used, dimensions, etc., as derived from the digital rendering(s) (e.g., 3D models) generated by the scanner 314 upon receipt of the dental impressions from a user administering the components of the at-home dental impression kit 306. The controller 312a may then interpret the executable code and automatically cause the printing hardware 312c to proceed with printing an oral device in accordance with the specifications provided within the executable code.

When the 3D printer 312 has finished printing the oral device specified within the executable code, the central server 318 (via the oral device processing application 206) may instruct the scanner 314 to scan the oral device in order to determine whether or not any defects/deviations exist relative to the digital rendering(s) generated based on the dental impressions from the at-home dental impression kit 306. Generally, the scanner 314 may include a controller 314a, a networking interface 314b, and scanning hardware 314c. The scanner 314 may receive executable code from the central server 318 and/or a user device (e.g., user computing device 302, 304, and/or dental office 305) via a wireless connection (e.g., via network 320) and/or a hardwired connection through the networking interface 314b. The controller 314a may then interpret the executable code and automatically cause the scanning hardware 314c to proceed with scanning the oral device. As a result, the scanner 314 may generate a 3D scan file of the oral device that includes the dimensions of the oral device. The scanner 314 (e.g., via the controller 314a) may further compare the 3D scan file of the oral device to the digital rendering(s) generated based on the dental impressions from the at-home dental impression kit 306 in order to determine whether or not a dimension of a portion of the oral device (also referenced herein as a "feature") exceeds a deviation threshold relative to the corresponding dimension of the portion of the oral device specified within the digital rendering(s).

In the event that a feature of the printed oral device exceeds the deviation threshold, the central server 318 (via the oral device processing application 206) may instruct the finishing module 316 to finish the identified feature of the oral device such that the feature is within the deviation threshold after finishing. Generally, the finishing module 316 may include a controller 316a, a networking interface 316b, and finishing hardware 316c. As described herein, the finishing hardware 316c may be any suitable finishing hardware. The finishing module 316 may receive executable code from the central server 318 and/or a patient device (e.g., user computing device 302, 304, and/or dental office 305) via a wireless connection (e.g., via network 320) and/or a hardwired connection through the networking interface 316b. The controller 316a may then interpret the executable code and automatically cause the finishing hardware 316c to proceed with finishing the oral device, such that at least the identified feature(s) of the oral device are brought within the deviation threshold relative to the corresponding dimension of the portion of the oral device specified within the digital rendering(s) generated based on the dental impressions from the at-home dental impression kit 306.

In certain aspects, the central server 318 may instruct the scanner 314 (e.g., via the controller 314a) to scan the finished oral device to generate a 3D scan file of the finished oral device, and thereafter compare the 3D scan file of the finished oral device to the original digital rendering(s) in order to determine whether or not a dimension of a feature of the finished oral device exceeds the deviation threshold relative to the corresponding dimension of the feature of the oral device specified within the original digital rendering(s). In these aspects, responsive to the scanner 314 determining that a feature of the finished oral device exceeds the deviation threshold relative to the corresponding dimension of the feature of the oral device specified within the original digital rendering(s), the central server 318 may instruct the finishing module 316 to finish the oral device a subsequent time to further finish at least the feature, such that the feature does not exceed the deviation threshold. Accordingly, the central server 318 may instruct the scanner 314 and the finishing module 316 to automatically re-scan and re-finish the oral device any number of times in order to ensure that all features of the oral device do not exceed the deviation threshold relative to the corresponding dimension of the feature of the oral device specified within the original digital rendering(s).

Figure 3B:
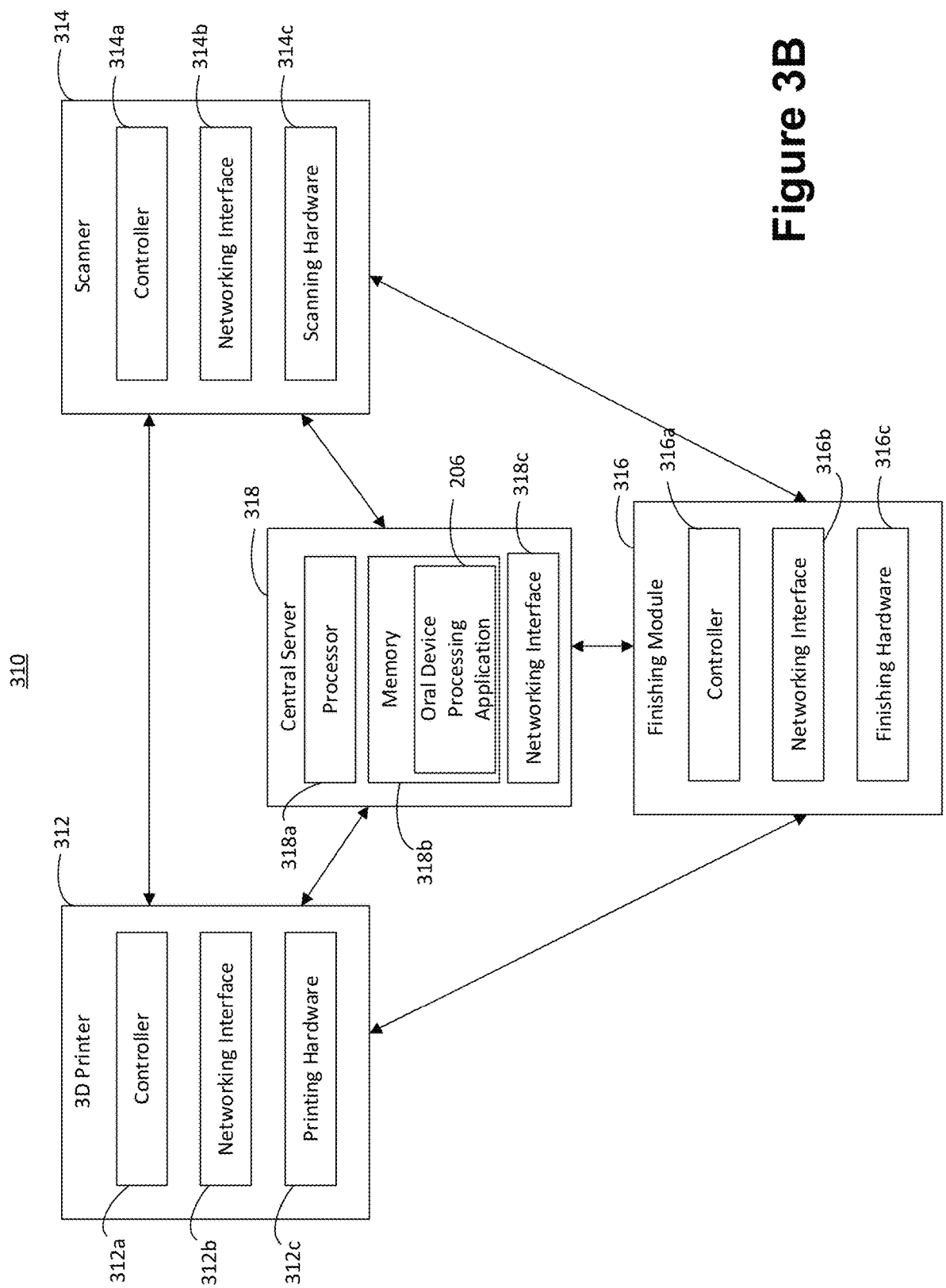
FIG. 3B is an example oral device fabrication system of FIG. 3A for providing oral devices using at-home dental impression kits, in accordance with embodiments described herein.

As illustrated in FIG. 3B, the central server 318 may include a processor 318a, a memory 318b containing the oral device processing application 206, and a networking interface 318c. The memory 318b (as well as the memories included as part of the controllers 312a, 314a, 316a) may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 318b (as well as the memories included as part of the controllers 312a, 314a, 316a) may store an operating system (OS) (e.g., Microsoft Windows, Linux, UNIX, etc.) capable of facilitating the functionalities, apps, methods, or other software as discussed herein. In addition, the memory 318b (as well as the memories included as part of the controllers 312a, 314a, 316a) may also store machine readable instructions, including any of one or more application(s) (e.g., oral device processing application 206), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, the oral device processing application 206, where each may be configured to facilitate their various functionalities discussed herein. It should be appreciated that one or more other applications may be envisioned and that are executed by the processor 318a and/or the controllers 312a, 314a, 316a.

The processor 318a may be connected to the memory 318b via a computer bus responsible for transmitting electronic data, data packets, or otherwise electronic signals to and from the processor 318a and the memory 318b in order to implement or perform the machine readable instructions, methods, processes, elements or limitations, as illustrated, depicted, or described for the various flowcharts, illustrations, diagrams, figures, and/or other disclosure herein. The processor 318a may interface with memory 318b via the computer bus to execute an operating system (OS). The processor 318a may also interface with the memory 318b via the computer bus to create, read, update, delete, or otherwise access or interact with the data stored in the memory 318b and/or an external database (not shown) (e.g., a relational database, such as Oracle, DB2, MySQL, or a NoSQL based database, such as MongoDB).

The networking interface 318c (as well as the interfaces 312b, 314b, 316b) may be configured to communicate (e.g., send and receive) data via one or more external/network port(s) to one or more networks or local terminals, such as computer network 320. In some aspects, the central server 318 may include a client-server platform technology such as ASP.NET, Java J2EE, Ruby on Rails, Node.js, a web service or online API, responsive for receiving and responding to electronic requests. The central server 318 may implement the client-server platform technology that may interact, via the computer bus, with the memory 318b (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

In various aspects, the central server 318 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to the computer network 320. In some embodiments, the computer network 320 may comprise a private network or local area network (LAN). Additionally, or alternatively, the computer network 320 may comprise a public network such as the Internet.

The central server 318 may further include or implement an operator interface configured to present information to an administrator or operator and/or receive inputs from the administrator or operator. For example, an operator interface may provide a display screen on a computing device located at an oral device processing facility containing the oral device processing system 310, and/or the central server 318 may generate the operator interface on a user's computing device (e.g., user computing devices 302, 304). The central server 318 may also provide I/O components (e.g., ports, capacitive or resistive touch sensitive input panels, keys, buttons, lights, LEDs), which may be directly accessible via, or attached to, the central server 318 or may be indirectly accessible via or attached to a terminal. According to some aspects, an administrator/operator (e.g., a dentist or dental technician), and/or a patient may access the central server 318 to review information, discuss oral device treatment options, preview oral device designs/digital renderings, make changes, input data files, initiate oral device processing, and/or perform other functions.

As described herein, in some aspects, the central server 318 may perform the functionalities as discussed herein as part of a "cloud" network or may otherwise communicate with other hardware or software components within the cloud to send, retrieve, or otherwise analyze data or information described herein.

In general, a computer program or computer based product, application (e.g., oral device processing application 206), or code may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor 318a and/or the controllers 312a, 314a, 316a (e.g., working in connection with the respective operating system in memory 318b) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

Figure 4:
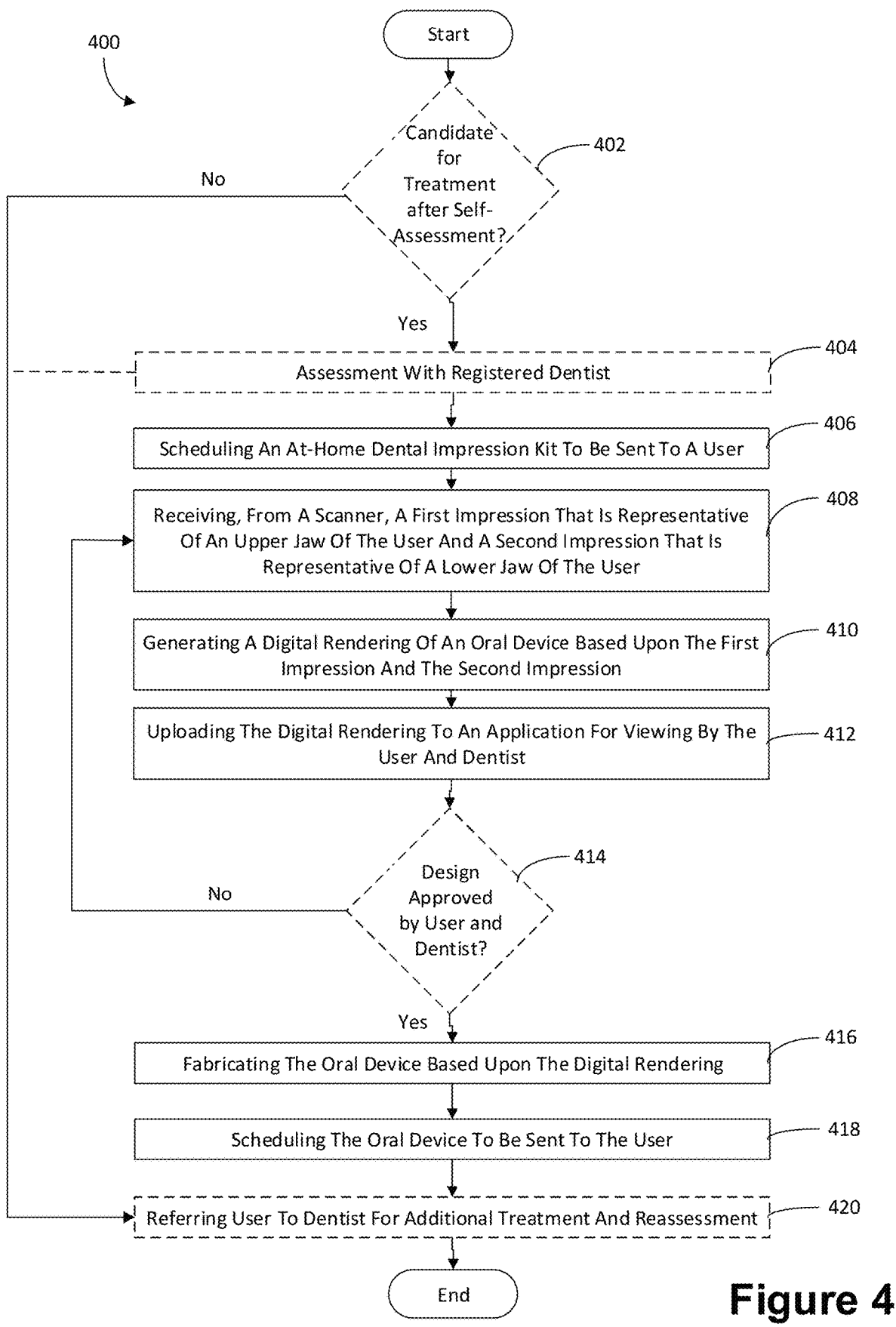
FIG. 4 is a flowchart representative of a method for providing oral devices using at-home dental impression kits, in accordance with embodiments described herein.

FIG. 4 is a flowchart representative of a method 400 for providing oral devices using at-home dental impression kits, in accordance with embodiments described herein. While described herein as performed by a server (e.g., central server 318) each of the blocks described in reference to the method 400 may be performed by any suitable processor, such as processor 318*a*, the memories included as part of controllers 312*a*, 314*a*, 316*a*, and or the processors included within the user computing devices 302, 304, and/or the dental office 305.

The method 400 may include determining whether or not a particular user is a candidate for treatment (e.g., tooth replacement) after conducting a self-assessment/pre-screening survey using the techniques of the present disclosure (optional block 402). The pre-screening survey may serve as an initial filter for potential patients that are readily identifiable as unsuitable for at-home/remote dental prosthesis fabrication. For example, users that have certain dental/medical complications such as broken teeth, cavities, and those users that need dental surgery for a variety of reasons may not be a suitable candidate for treatment using the techniques disclosed herein.

More generally, in certain aspects, the user may complete a pre-screening survey (e.g., a guided self-assessment) to determine whether or not the user is a candidate for treatment. The pre-screening survey may be embodied as a web form, electronic message, and/or other data submitted by a user that is indicative of whether or not the user is a suitable candidate for treatment using the disclosed techniques. The pre-screening survey may include questions for a user to indicate the current condition of the user's mouth, as previously described, and the user's interest (e.g., whether or not the user requires tooth replacement). For example, the pre-screening survey may include 5 questions that prompt a user to indicate, inter alia, whether or not the user has broken teeth, cavities, or has been recommended oral surgery by a dentist. The pre-screening survey may be presented to a user, at the user's device as one or a series of graphical user interfaces (GUI) with selectable fields for the user to indicate responses to each of the prompts/questions included as part of the pre-screening survey. A user's responses to the pre-screening survey may be submitted in response to a web form or other web page that includes the questions and/or instructions comprising the pre-screening survey.

After receiving the user's responses to the pre-screening survey, the central server (e.g., central server 318) may determine, at optional block 402, whether or not the user is a suitable candidate for treatment based on the user's responses. If the server determines that the user is not a suitable candidate, the method 400 may end ("No" branch of optional block 402) and/or optionally refer the user to a registered dentist for additional treatment and a reassessment of the user's case (optional block 420). However, if the server determines that the user is a suitable candidate for treatment, the method 400 may proceed to optional block 404 ("Yes" branch of block 402).

The method 400 may also include a user electing to conduct an optional initial assessment with a registered dentist (optional block 404). For example, the user may elect the initial assessment with the registered dentist via a live streaming service (e.g., live video service to conduct a synchronous consult with the registered dentist), and/or via an asynchronous medium (e.g., by sharing the user's patient chart for review). As a result of the initial assessment, the dentist may either recommend that the user perform at-home dental impressions (e.g., proceeding to block 406) or that the user proceed with an alternative means of treatment (e.g., optionally proceeding to optional block 420).

The method 400 may also include scheduling an at-home dental impression kit to be sent to the user (block 406). Generally, the at-home dental impression kit may include each of the devices discussed herein, and may specifically include at least (i) one or more dental trays and (ii) one or more sets of dental putty that are configured to capture the gingiva of the user without distorting the gum lines of the user. In certain aspects, the server may schedule the at-home dental impression kit to be sent to the user in response to determining that the user is a candidate for treatment based on the user's responses to the pre-screening survey. Further in these aspects, and responsive to determining that the patient is a candidate for treatment, the server may schedule the user for a real-time consultation with a dentist.

Moreover, in some aspects, the at-home dental impression kit may include a website link or a code configured to be scanned by a mobile device that provides video instructions to assist the user in taking the first impression and the second impression. For example, the website link or the code (e.g., quick response (QR) code, barcode, etc.) may be included on the instruction pamphlet within the at-home dental impression kit. The website or otherwise application resulting from scanning the code may provide instructions to the user, for example, on how to mix the dental putty, how to load the dental putty into the impression trays, and/or what dental impressions of sufficient quality look like.

The method 400 may also include receiving, from a scanner, a first impression that is representative of an upper jaw of the user that is captured using a first dental tray and a first set of dental putty, and a second impression that is representative of a lower jaw of the user that is captured using a second dental tray and a second set of dental putty (block 408). In certain aspects, the first impression may include impressions representative of the teeth of the upper jaw of the user, the oral arches of the upper jaw of the user, and the gingiva of the upper jaw of the user. Further, the second impression may include impressions representative of the teeth of the lower jaw of the user, the oral arches of the lower jaw of the user, and the gingiva of the lower jaw of the user.

In some aspects, the at-home dental impression kit may also include a tooth shade guide (e.g., shade guide 160). In these aspects, the method 400 may further include receiving, from the user, an image of the teeth of the user and the tooth shade guide. Thereafter, the processors may compare the teeth of the user featured in the image to the tooth shade guide, and determine a tooth shade of the teeth of the user based on the comparison. As a result, the oral device processing system may fabricate the oral device such that any teeth included as part of the oral device are the tooth shade. As part of these aspects, the instructions included as part of the at-home dental impression kit and/or the online instructions may provide instructions/suggestions related to which views to capture and upload of a user's mouth for color matching, and may provide tips to improve image quality. As an example, the instructions may recommend that the user has another person assist in taking the images and/or may recommend using a flash or a bright light source such as a bathroom light or a window on a sunny day.

The method 400 may further include generating a digital rendering of an oral device based upon the first impression and the second impression (block 410). In certain aspects, the at-home dental impression kit may further include a bite registration tray (e.g., bite registration tray 140). Further in these aspects, the scanner may scan a third impression that is representative of the upper jaw of the user and the lower jaw of the user that is captured using the bite registration tray and a third set of dental putty. Using this scan, the scanner may also generate the digital rendering based further upon the third impression, and the oral device processing system may generally fabricate the oral device based on the digital rendering.

In certain aspects, the at-home dental impression kit may not include a bite registration tray, and as a result, generating the digital rendering may not be based upon the first impression and the second impression. In these aspects, the patient may be instructed to utilize the impression putty included as part of the at-home dental impression kit to record a matrix (e.g., a negative imprint) of the buccal and facial surfaces of the patient's teeth while the patient is biting down in maximum intercuspation and centric relation. Additionally, or alternatively, the patient may not record a bite via impression putty at all, and instead, the patient may have a physical model of the patient's upper and lower jaws produced and articulated manually based on the patient's natural centric relation.

Further, in some aspects, the method 400 may include virtually articulating the patient's upper and lower arches into maximum intercuspation based on the patient's centric relation utilizing artificial intelligence (AI). More specifically, the method 400 may further include utilizing a trained AI model to virtually articulate the patient's arches into maximum intercuspation based on the patient's centric relation.

The method 400 may further include uploading the digital rendering to an application for viewing by the user and a registered dentist (block 412). In some aspects, the sever or other suitable processor may display (as part of an application), the digital rendering to the user. As part of the display, the processor may include a plurality of dimensions of the digital rendering and a projected fit of the oral device. Thus, the method 400 may proceed to receive, from the user and/or the registered dentist via the application, either an approval or a denial corresponding to the digital rendering (optional block 414).

In certain aspects, the server may also automatically transmit the digital rendering to a dentist for the dentist's review. Additionally, the server may schedule a rendering review session with the user and dentist to allow the user and the dentist to substantially simultaneously review the digital rendering and projected fit in real-time. For example, the server may provide the digital rendering of the oral device and the projected fit of the oral device, images of the user's mouth and teeth, as well as a user's dental history to a dental professional, hygienist, technician, etc. for review and approval. The dental professional, hygienist, technician, etc. may review the rendering, projected fit, images and the user's dental history to determine whether the oral device design should be approved as treatment for the user. More generally, a dentist must approve the design (represented by the digital rendering) for the oral device before it is fabricated. If the user does not elect for the optional assessment (e.g., optional block 404), a licensed dentist in the user's state of residence may be assigned by to review and approve the user's case and prosthetic design. As such, no prosthetic may ever be manufactured without a licensed dentist's approval.

As an example, the dental professional, hygienist, technician, etc. may determine whether the digital rendering of the oral device will adequately address the issues experienced by the user. Namely, the dental professional may analyze the projected fit of the oral device, and may determine that the user may experience little to no pain from the proposed oral device design, and as a result, may recommend to the user during the rendering review session that the user should approve the proposed oral device design (embodied by the digital rendering). Thus, as a result of the rendering review session between the user and the dental professional(s), the server may receive either the approval or the denial during or after the rendering review session.

In any event, responsive to receiving a denial from the user and registered dentist, the method 400 may proceed to block 408 in order to receive re-scanned and/or to re-design the dental impressions and proposed oral devices for a user ("No" branch of optional block 414). However, in response to receiving an approval from the user and registered dentist, the method 400 may proceed with fabricating the oral device at block 416 ("Yes" branch of optional block 414).

The method 400 may also include fabricating the oral device based upon the digital rendering (block 416). In some aspects, and as previously mentioned, the oral device may be a partial denture configured to replace one or more missing teeth of the user. Of course, the oral device may be any suitable device, such as dentures, implants, aligners, crowns, veneers, partials, relines, mouth guards, retainers, and so forth. Thereafter, the server may schedule the oral device to be sent to the user (block 418). Moreover, the method 400 may include referring the user to a registered dentist for additional treatment and/or a case reassessment (optional block 420). For example, the user may conduct a live video consult with the registered dentist, and the registered dentist may provide the user with information relating to instructions for inserting the oral device into the user's mouth, cleaning the oral device, general care for the oral device, and/or risks and benefits of the oral device or combinations thereof.

Additional Aspects

1. A system for providing oral devices using at-home dental impression kits, the system comprising: one or more processors; and one or more non-transitory memories, wherein the one or more non-transitory memories store computer-readable instructions that specially configure the system such that, when executed by the one or more processors, the one or more non-transitory memories cause the system to: schedule an at-home dental impression kit to be sent to a user, wherein the at-home dental impression kit includes at least (i) one or more dental trays and (ii) one or more sets of dental putty that are configured to capture the gingiva of the user without distorting the gum lines of the user, receive, from a scanner, a first impression that is representative of an upper jaw of the user that is captured using a first dental tray and a first set of dental putty, and a second impression that is representative of a lower jaw of the user that is captured using a second dental tray and a second set of dental putty, generate a digital rendering of an oral device based upon the first impression and the second impression, upload the digital rendering to an application for viewing by the user, fabricate an oral device based upon the digital rendering, and schedule the oral device to be sent to the user.

2. The system of aspect 1, wherein the first impression includes impressions representative of the teeth of the upper jaw of the user, the oral arches of the upper jaw of the user, and the gingiva of the upper jaw of the user, and wherein and the second impression includes impressions representative of the teeth of the lower jaw of the user, the oral arches of the lower jaw of the user, and the gingiva of the lower jaw of the user.

3. The system of any of aspects 1-2, wherein the oral device is a partial denture configured to replace one or more missing teeth of the user.

4. The system of any of aspects 1-3, wherein the at-home dental impression kit further includes a bite registration tray, and the computer-readable instructions further configure the system such that, when executed by the one or more processors, the one or more non-transitory memories cause the system to: receive, from the scanner, a third impression that is representative of the upper jaw of the user and the lower jaw of the user that is captured using the bite registration tray and a third set of dental putty, generate the digital rendering further based on the third impression, and fabricate the oral device based on the digital rendering.

5. The system of any of aspects 1-4, wherein the at-home dental impression kit further includes a tooth shade guide, and the computer-readable instructions further configure the system such that, when executed by the one or more processors, the one or more non-transitory memories cause the system to: receive, from the user, an image of the teeth of the user and the tooth shade guide, compare the teeth of the user featured in the image to the tooth shade guide, determine a tooth shade of the teeth of the user based on the comparison, and fabricate the oral device such that any teeth included as part of the oral device are the tooth shade.

6. The system of any of aspects 1-5, wherein the computer-readable instructions further configure the system such that, when executed by the one or more processors, the one or more non-transitory memories cause the system to: display, via the application, the digital rendering to the user, including a plurality of dimensions of the digital rendering and a projected fit of the oral device, receive, from the user via the application, either an approval or a denial corresponding to the digital rendering, and responsive to receiving the approval from the user, fabricate the oral device.

7. The system of any of aspects 1-6, wherein the computer-readable instructions further configure the system such that, when executed by the one or more processors, the one or more non-transitory memories cause the system to: receive, from a user, responses to a pre-screening survey, determine whether or not the user is a candidate for treatment, and responsive to determining that the user is a candidate for treatment, scheduling the at-home dental impression kit to be sent to the user.

8. The system of aspect 7, wherein the computer-readable instructions further configure the system such that, when executed by the one or more processors, the one or more non-transitory memories cause the system to: responsive to determining that the patient is a candidate for treatment, scheduling the user for a real-time consultation with a dentist.

9. The system of any of aspects 1-8, wherein the at-home dental impression kit further includes a website link or a code configured to be scanned by a mobile device that provides video instructions to assist the user in taking the first impression and the second impression.

10. A method for providing oral devices using at-home dental impression kits, the method comprising: scheduling, by one or more processors, an at-home dental impression kit to be sent to a user, wherein the at-home dental impression kit includes at least (i) one or more dental trays and (ii) one or more sets of dental putty that are configured to capture the gingiva of the user without distorting the gum lines of the user; scanning, using a scanner, a first impression that is representative of an upper jaw of the user that is captured using a first dental tray and a first set of dental putty, and a second impression that is representative of a lower jaw of the user that is captured using a second dental tray and a second set of dental putty; generating, by the one or more processors, a digital rendering of an oral device based upon the first impression and the second impression; uploading, by the one or more processors, the digital rendering to an application for viewing by the user; fabricating an oral device based upon the digital rendering; and scheduling, by the one or more processors, the oral device to be sent to the user.

11. The method of aspect 10, wherein the first impression includes impressions representative of the teeth of the upper jaw of the user, the oral arches of the upper jaw of the user, and the gingiva of the upper jaw of the user, and wherein and the second impression includes impressions representative of the teeth of the lower jaw of the user, the oral arches of the lower jaw of the user, and the gingiva of the lower jaw of the user.

12. The method of any of aspects 10-11, wherein the oral device is a partial denture configured to replace one or more missing teeth of the user.

13. The method of any of aspects 10-12, wherein the at-home dental impression kit further includes a bite registration tray, and the method further comprises: scanning, by the scanner, a third impression that is representative of the upper jaw of the user and the lower jaw of the user that is captured using the bite registration tray and a third set of dental putty; generating the digital rendering further based on the third impression; and fabricating the oral device based on the digital rendering.

14. The method of any of aspects 10-13, wherein the at-home dental impression kit further includes a tooth shade guide, and the method further comprises: receiving, from the user, an image of the teeth of the user and the tooth shade guide; comparing, by the one or more processors, the teeth of the user featured in the image to the tooth shade guide; determining, by the one or more processors, a tooth shade of the teeth of the user based on the comparison; and fabricating the oral device such that any teeth included as part of the oral device are the tooth shade.

15. The method of any of aspects 10-14, further comprising: displaying, via the application, the digital rendering to the user, including a plurality of dimensions of the digital rendering and a projected fit of the oral device; receiving, from the user via the application, either an approval or a denial corresponding to the digital rendering; and responsive to receiving the approval from the user, fabricating the oral device.

16. The method of aspect 15, further comprising: automatically transmitting, by the one or more processors, the digital rendering to a dentist; scheduling, by the one or more processors, a rendering review session with the user and dentist to allow the user and the dentist to substantially simultaneously review the digital rendering and the projected fit in real-time; and receiving, from the user via the application, either the approval or the denial during the rendering review session.

17. The method of any of aspects 10-16, further comprising: receiving, from a user, responses to a pre-screening survey; determining, by the one or more processors, whether or not the user is a candidate for treatment; and responsive to determining that the user is a candidate for treatment, scheduling, by the one or more processors, the at-home dental impression kit to be sent to the user.

18. The method of aspect 17, further comprising: responsive to determining that the patient is a candidate for treatment, scheduling, by the one or more processors, the user for a real-time consultation with a dentist.

19. The method of any of aspects 10-18, wherein the at-home dental impression kit further includes a website link or a code configured to be scanned by a mobile device that provides video instructions to assist the user in taking the first impression and the second impression.

20. A non-transitory computer-readable storage medium having stored thereon a set of instructions, executable by at least one processor, for providing oral devices using at-home dental impression kits, the instructions comprising: instructions for scheduling an at-home dental impression kit to be sent to a user, wherein the at-home dental impression kit includes at least (i) one or more dental trays and (ii) one or more sets of dental putty that are configured to capture the gingiva of the user without distorting the gum lines of the user; instructions for receiving, from a scanner, a first impression that is representative of an upper jaw of the user that is captured using a first dental tray and a first set of dental putty, and a second impression that is representative of a lower jaw of the user that is captured using a second dental tray and a second set of dental putty; instructions for generating a digital rendering of an oral device based upon the first impression and the second impression; instructions for uploading the digital rendering to an application for viewing by the user; instructions for fabricating an oral device based upon the digital rendering; and instructions for scheduling the oral device to be sent to the user.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. A system for providing oral devices, the system comprising:
   one or more processors;
   one or more non-transitory memories,
   wherein the one or more non-transitory memories store computer-readable instructions that, when executed by the one or more processors, cause the system to:
      receive (i) a first scan file of a first impression that is representative of an upper jaw of a user and (ii) a second scan file of a second impression that is representative of a lower jaw of the user,
      generate a device digital rendering of an oral device based upon the first scan file and the second scan file, at least in part by:
         determining (i) a gingiva loss value and (ii) a socket dimension estimate corresponding to one or more digitally removed teeth from the first scan file or the second scan file, and
         determining, based on the gingiva loss value and the socket dimension estimate, a dimension of (i) a fabricated gingiva and (ii) a fabricated tooth to be included in the oral device that replace a gingiva of the user and a tooth of the user,
      display the device digital rendering to the user, including a plurality of dimensions of the device digital rendering, and
      generate a control instruction including instructions to fabricate the oral device based upon the device digital rendering; and
   a fabrication device configured to:
      receive the control instruction, and
      fabricate the oral device in accordance with the control instruction.

2. The system of claim 1, wherein:
   the first impression includes impressions representative of teeth of the upper jaw of the user, oral arches of the upper jaw of the user, and gingiva of the upper jaw of the user,
   the second impression includes impressions representative of teeth of the lower jaw of the user, oral arches of the lower jaw of the user, and gingiva of the lower jaw of the user, and
   a first set of dental putty configured to capture the first impression and a second set of dental putty configured to capture the second impression are further configured to capture the gingiva of the user without distorting gum lines of the user.

3. The system of claim 1, wherein the oral device is a partial denture configured to replace one or more missing teeth of the user.

4. The system of claim 1, further comprising a scanner, and wherein the computer-readable instructions, when executed by the one or more processors, further cause the system to:
   transmit a second control instruction to the scanner to cause the scanner to generate a third scan file of a third impression representative of a bite registration of the upper jaw of the user relative to the lower jaw of the user,
   receive, from the scanner, the third scan file, and
   generate the device digital rendering further based on the third scan file.

5. The system of claim 1, wherein the computer-readable instructions, when executed by the one or more processors, further cause the system to:
   receive, from the user, an image of teeth of the user and a tooth shade guide,
   compare the teeth of the user featured in the image to the tooth shade guide,
   determine a tooth shade of the teeth of the user based on the comparison, and
   generate the control instruction to cause the fabrication device to fabricate the oral device such that any teeth included as part of the oral device are the tooth shade.

6. The system of claim 1, further comprising an application, wherein the computer-readable instructions, when executed by the one or more processors, further cause the system to:
   determine a projected fit of the oral device based on the device digital rendering,
   display, via the application, the device digital rendering to the user, including the projected fit of the oral device,
   receive, from the user via the application, either an approval or a denial corresponding to the device digital rendering,
   responsive to receiving the approval from the user, transmit the control instruction to the fabrication device to fabricate the oral device, and
   schedule the oral device to be sent to the user.

7. The system of claim 1, wherein the computer-readable instructions, when executed by the one or more processors, further cause the system to:
receive, from the user, responses to a pre-screening survey,
determine whether the user is a candidate for treatment, and
responsive to determining that the user is a candidate for treatment, scheduling an at-home dental impression kit to be sent to the user.

8. The system of claim 7, wherein the computer-readable instructions, when executed by the one or more processors, further cause the system to:
responsive to determining that the user is a candidate for treatment, scheduling the user for a real-time consultation with a dentist.

9. The system of claim 1, further comprising an at-home dental impression kit that includes a website link or a code configured to be scanned by a mobile device that provides video instructions to assist the user in taking the first impression and the second impression.

10. The system of claim 1, further comprising a finishing device, and wherein the computer-readable instructions, when executed by the one or more processors, further cause the system to:
determine that a dimension of a portion of the oral device exceeds a deviation threshold relative to a corresponding dimension of the portion of the oral device specified within the device digital rendering; and
generate a second control instruction configured to cause the finishing device to finish the portion of the oral device such that the portion is within the deviation threshold after finishing,
wherein the finishing device is configured to finish the portion of the oral device in accordance with the second control instruction.

11. A method for providing oral devices, the method comprising:
receiving (i) a first scan file of a first impression that is representative of an upper jaw of a user and (ii) a second scan file of a second impression that is representative of a lower jaw of the user;
generating, by one or more processors, a device digital rendering of an oral device based upon the first scan file and the second scan file at least in part by:
determining, by one or more processors, (i) a gingiva loss value and (ii) a socket dimension estimate corresponding to one or more digitally removed teeth from the first scan file or the second scan file, and
determining, by the one or more processors based on the gingiva loss value and the socket dimension estimate, a dimension of (i) a fabricated gingiva and (ii) a fabricated tooth to be included in the oral device that replace a gingiva of the user and a tooth of the user;
displaying the device digital rendering to the user, including a plurality of dimensions of the device digital rendering;
generating, by the one or more processors, a control instruction including instructions to fabricate the oral device based upon the device digital rendering; and
fabricating, by a fabrication device, the oral device in accordance with the control instruction.

12. The method of claim 11, wherein:
the first impression includes impressions representative of teeth of the upper jaw of the user, oral arches of the upper jaw of the user, and gingiva of the upper jaw of the user, and the first impression is captured by a first set of dental putty configured to capture the gingiva of the upper jaw of the user without distorting gum lines of the user,
the second impression includes impressions representative of teeth of the lower jaw of the user, oral arches of the lower jaw of the user, and gingiva of the lower jaw of the user, and the second impression is captured by a second set of dental putty configured to capture the gingiva of the lower jaw of the user without distorting gum lines of the user.

13. The method of claim 11, wherein the oral device is a partial denture configured to replace one or more missing teeth of the user.

14. The method of claim 11, wherein the method further comprises:
transmitting, by the one or more processors, a second control instruction to a scanner to cause the scanner to generate a third scan file of a third impression representative of a bite registration of the upper jaw of the user relative to the lower jaw of the user;
receiving, from the scanner, the third scan file; and
generating, by the one or more processors, the device digital rendering further based on the third scan file.

15. The method of claim 11, wherein the method further comprises:
receiving, from the user, an image of teeth of the user and a tooth shade guide;
comparing, by the one or more processors, the teeth of the user featured in the image to the tooth shade guide;
determining, by the one or more processors, a tooth shade of the teeth of the user based on the comparison; and
generating, by the one or more processors, the control instruction to cause the fabrication device to fabricate the oral device such that any teeth included as part of the oral device are the tooth shade.

16. The method of claim 11, further comprising:
determining, by the one or more processors, a projected fit of the oral device based on the device digital rendering;
displaying, via an application, the device digital rendering to the user, including the projected fit of the oral device;
receiving, from the user via the application, either an approval or a denial corresponding to the device digital rendering;
responsive to receiving the approval from the user, transmitting, by the one or more processors, the control instruction to cause the fabrication device to fabricate the oral device; and
scheduling, by the one or more processors, the oral device to be sent to the user.

17. The method of claim 16, further comprising:
automatically transmitting, by the one or more processors, the device digital rendering to a dentist;
scheduling, by the one or more processors, a rendering review session with the user and the dentist to allow the user and the dentist to substantially simultaneously review the device digital rendering in real-time; and
receiving, from the user via the application, either the approval or the denial during the rendering review session.

18. The method of claim 11, further comprising:
receiving, from the user, responses to a pre-screening survey;
determining, by the one or more processors, whether the user is a candidate for treatment; and responsive to determining that the user is a candidate for treatment, scheduling, by the one or more processors, an at-home dental impression kit to be sent to the user.

19. The method of claim 18, further comprising:
responsive to determining that the user is a candidate for treatment, scheduling, by the one or more processors, the user for a real-time consultation with a dentist.

20. The method of claim 11, further comprising:
scheduling, by the one or more processors, an at-home dental impression kit to be sent to the user, wherein the at-home dental impression kit includes a website link or a code configured to be scanned by a mobile device that provides video instructions to assist the user in taking the first impression and the second impression.

* * * * *